US005478580A

United States Patent [19]
Foster, II

[11] Patent Number: 5,478,580
[45] Date of Patent: Dec. 26, 1995

[54] METHOD FOR THE PRODUCTION OF A PURIFIED ISO-ALPHA-ACID CONCENTRATE FROM HOP EXTRACT

[75] Inventor: Robert T. Foster, II, Morrison, Colo.

[73] Assignee: Coors Brewing Company, Golden, Colo.

[21] Appl. No.: 184,310

[22] Filed: Jan. 21, 1994

[51] Int. Cl.$^6$ .................................. C12C 3/00; C12C 3/12
[52] U.S. Cl. ............................ 426/16; 426/424; 426/490; 426/600
[58] Field of Search ........................... 426/600, 16, 424, 426/490

[56] References Cited

U.S. PATENT DOCUMENTS

| | | | |
|---|---|---|---|
| 3,418,135 | 12/1968 | Bayne | 426/600 |
| 3,607,300 | 9/1971 | Mitchell . | |
| 3,956,513 | 5/1976 | Clarke et al. . | |
| 3,965,188 | 6/1976 | Westermann et al. | 260/586 D |
| 4,395,431 | 7/1983 | Lance et al. . | |
| 4,590,296 | 5/1986 | Cowles et al. . | |
| 4,780,330 | 10/1988 | Laws . | |
| 4,839,189 | 6/1989 | Forrest et al. | 426/600 |
| 4,844,912 | 7/1989 | Haas et al. . | |
| 4,844,939 | 7/1989 | Todd, Jr. . | |
| 5,015,491 | 5/1991 | Westwood et al. . | |
| 5,370,897 | 12/1994 | Smith et al. | 426/600 |

OTHER PUBLICATIONS

Verzele, M., et al., *Developments in Food Science*, vol. 27, (Elsevier Co., Amsterdam 1991), pp. 1–51, 109–111, and 201–215.
Hough, J. S., et al., *Malting and Brewing Science*, vol.2, Chapman and Hall, Ltd., Cambridge (1982), pp. 403–405.

*Primary Examiner*—Carolyn Paden
*Assistant Examiner*—Curtis E. Sherrer
*Attorney, Agent, or Firm*—Klaas, Law, O'Meara & Malkin; Jay K. Malkin

[57] ABSTRACT

A specialized process for producing purified iso-alpha-acids from hop extract. Hop extract is first combined with a metal salt isomerizing agent. The mixture is preferably boiled to ensure complete isomerization. First organic and aqueous phases are produced, followed by washing of the first organic phase with a primary acid. These materials are preferably boiled during washing. A second organic and aqueous phase are produced, with the second organic phase being washed with a primary alkaline washing agent. Optimum results are achieved if boiling temperatures are maintained during washing. Third organic and aqueous phases are then produced, with the third aqueous phase being washed using a secondary acid to generate fourth organic and aqueous phases. The fourth organic phase (containing purified iso-alpha-acids) may then be stored and subsequently treated with a secondary alkaline washing agent to produce an aqueous concentrate used in brewed beverage production.

20 Claims, No Drawings

METHOD FOR THE PRODUCTION OF A PURIFIED ISO-ALPHA-ACID CONCENTRATE FROM HOP EXTRACT

BACKGROUND OF THE INVENTION

The present invention generally relates to the production of concentrated hop materials, and more particularly to the production of a purified, iso-alpha-acid concentrate suitable for use in the production of brewed beverages.

The production of beer and other brewed beverages has traditionally involved the addition of hops and hop derivatives thereto. In particular, hop materials impart a distinctive, bitter flavor to brewed beverages. As described in Verzele, M., et al., *Developments in Food Science*, Vol. 27, (Elsevier Co., Amsterdam 1991), pp. 1–51, hop plants are in the Cannabinaceae family. Hop materials used in the production of beer and other brewed beverages are primarily derived from a plant in the genus Humulus known as *Humulus lupulus L.* The key flavoring ingredients obtained from hop plants reside within cone-like structures which are harvested and used in manufacturing brewed beverages. The primary flavoring ingredients in hop cones involve materials known as "alpha-acids". These alpha-acids shall be defined herein to encompass three primary compositions as follows:

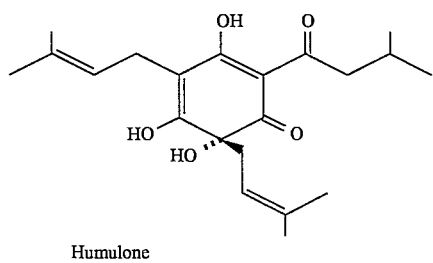

Humulone

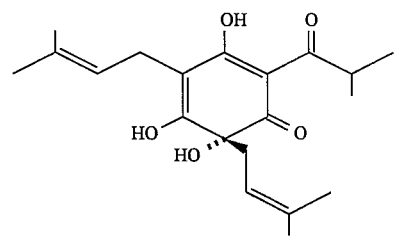

Cohumulone

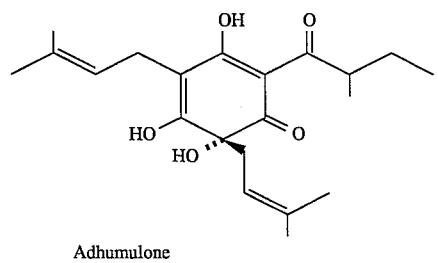

Adhumulone

Other humulones derived from hops which are encompassed within the term "alpha acids" include the following materials in lesser amounts:

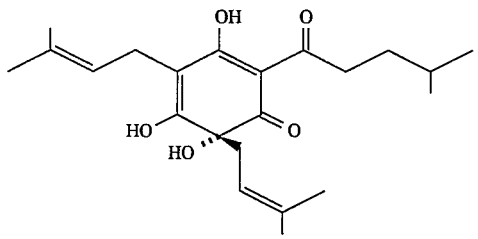

Prehumulone

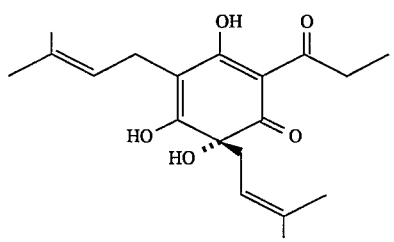

Posthumulone

Of the total amount of alpha-acids present, tests have indicated that the foregoing ingredients are present in the following approximate proportions (% by weight): Humulone (35–70%), Cohumulone (20–65%), Adhumulone (10–15%), Prehumulone (1–10%), and Posthumulone (1–3%).

To be used in the production of brewed beverages as flavoring agents, the foregoing alpha-acids must be isomerized to form derivatives known as "iso-alpha-acids" The term "iso-alpha-acids" shall encompass the cis and trans isomerized forms of the humulones listed above, with the trans forms illustrated as follows:

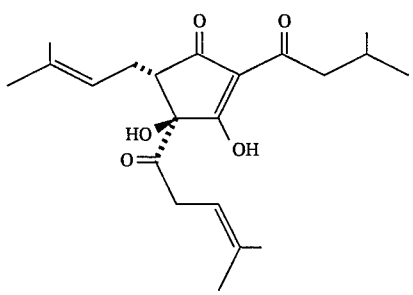

Isohumulone

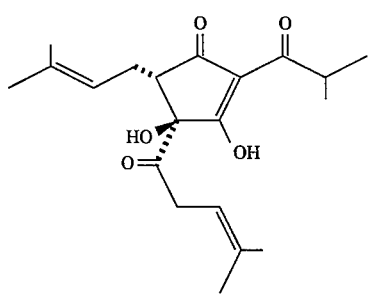

Isocohumulone

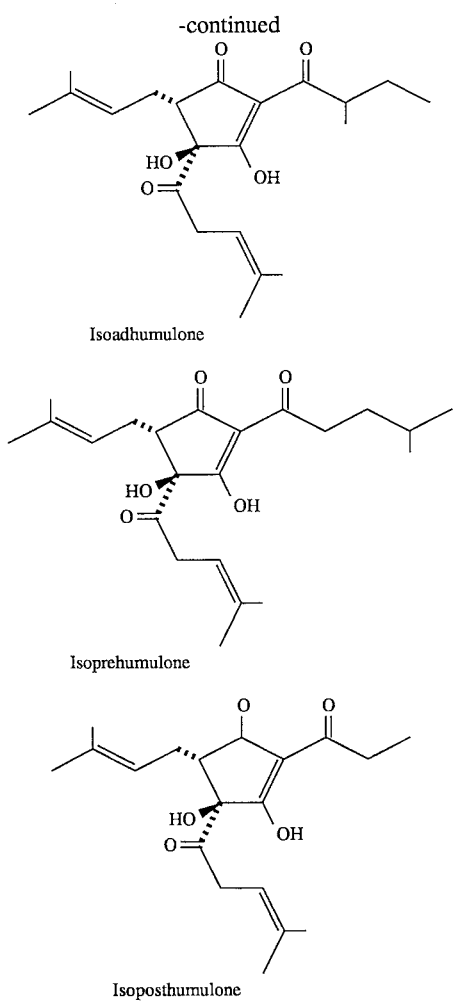

Isoadhumulone

Isoprehumulone

Isoposthumulone

There are numerous methods in which the isomerization of alpha-acids in hop materials (e.g. cones and extracts) may be achieved. For example, in the brewing of beer and other malt beverages, the addition of hops and/or hop extracts to the brew kettle, followed by the boiling thereof will result in the conversion of alpha-acids to iso-alpha-acids. However, this procedure is relatively inefficient and will typically result in the isomerization of only about ⅓ or less of the alpha-acids to iso-alpha-acids. Other processes involve the boiling of hop materials (e.g. hops or hop extracts) in highly alkaline solutions (e.g. NaOH). When this process is used, care must be taken to avoid pH levels above about 9.0 since degradation of the resulting iso-alpha-acids may take place at such levels.

Another method for the production of iso-alpha-acids involves the use of metallic isomerization materials. In particular, such materials are described in Verzele, M., et al., *Developments in Food Science*, Vol. 27, supra (pp. 109–111), and in U.S. Pat. No. 5,015,491 to Westwood et al. With reference to U.S. Pat. No. 5,015,491, a process is described wherein a hop extract is combined with a solid alkaline or alkaline earth metal salt (e.g. MgO) at a temperature of at least about 80° C. In one embodiment of Westwood et al., a solid isohumulone mass is formed which may be added to the boiling contents of the brew kettle during the production of beer and other brewed beverages. Alternatively, the solid mass may be purified using a sequential acid/base treatment procedure conducted at sub-boiling temperatures. The use of metal compositions for the isomerization of alpha-acids is likewise discussed in U.S. Pat. No. 3,956,513 to Clarke et al.

While alpha-acids are effectively isomerized to iso-alpha-acids through the use of metal salt compositions, the use of metal-isomerized iso-alpha-acids in brewed beverages normally introduces metal ions into the production process. These metal ions (especially Mg, Ca, and Zn ions) can cause numerous problems in the final product, including but not limited to a hazy appearance and an undesirable flavor. In addition, excessive amounts of Fe and Cu ions can cause the generation of molecular oxygen in the final product which causes a corresponding deterioration in flavor and palatability. Thus, in a metal-catalyzed alpha-acid isomerization process, it is important to minimize the amount of metal compositions being used, and likewise ensure that the final isomerized product (e.g. the resulting iso-alpha-acid materials) have little or no residual metal ions associated therewith. In addition to achieving the foregoing goals, it is also important that reaction conditions be precisely controlled so that the isomerization process is driven to completion, thereby ensuring maximum economy and efficiency.

The present invention involves a unique and efficient method for generating a highly purified supply of iso-alpha-acids using metallic isomerizing agents which substantially minimizes the presence of extraneous metal ions in the final product (e.g. residual metal ions derived from the isomerizing agent). The invention likewise enables the isomerization process to occur in a substantially complete manner, thereby ensuring that the starting materials in the process (e.g. hop extract) are used in the most efficient manner possible.

Finally, the process described herein enables the production of a purified, concentrated supply of iso-alpha-acid materials which is not only substantially free from residual metal ions, but likewise includes minimal amounts of (1) terpene-based oil materials normally present in hops (hereinafter "hop oils"); and (2) materials known as beta-acids which primarily involve two compositions known as "lupulone" and "colupulone". Beta-acids are discussed in detail in Verzele, M., et al., *Developments in Food Science*, Vol. 27, supra (pp. 201–215), and are well known with respect to their characteristics and structural configurations. Both beta-acids and hop oils have unique aromatic and flavoring characteristics which may not be necessary or desired in brewed beverage products. Because the present invention accomplishes all of the foregoing goals, it represents an advance in the art of hop processing, and satisfies the need for a method in which iso-alpha-acid concentrate compositions may be produced with a maximum degree of purity and efficiency.

SUMMARY OF THE INVENTION

It is an object of the present invention to provide a method for producing a purified supply of iso-alpha-acid materials from hop extracts in a rapid and efficient manner.

It is another object of the invention to provide a method for producing a purified supply of iso-alpha-acid materials using metal salt isomerizing agents in which the supply is characterized by the substantial absence of residual metal ions therein.

It is another object of the invention to provide a method for producing a purified supply of iso-alpha-acid materials in which the supply is characterized by a minimal amount of hop oils and beta-acids therein.

It is a further object of the invention to provide a method for producing a purified supply of iso-alpha-acid materials which uses a minimal number of processing steps.

It is a further object of the invention to provide a method for producing a purified supply of iso-alpha-acid materials wherein the reaction steps in the method are undertaken in a manner in which the various chemical reactions proceed to a maximum degree of completion.

It is a still further object of the invention to provide a method for producing a purified supply of iso-alpha-acids which is in concentrated form and may be stored for substantial periods of time without deterioration.

It is an even further object of the invention to provide a method for producing a purified supply of iso-alpha-acid materials which, when used by brewers in the production of brewed beverages, enables a substantial reduction in the amount of hop materials needed, thereby improving the efficiency of the entire brewing process.

In accordance with the foregoing objects, the present invention involves unique and highly efficient process for the production of a purified supply of iso-alpha-acid materials from hop extracts. The method described below uses metal salt isomerizing agents to convert alpha-acids to iso-alpha-acid materials. The resulting supply of purified iso-alpha-acids is characterized by the substantial absence of residual metal ions, beta-acids, and hop oils therein. In addition, the process of the invention uses a unique combination of steps which achieves maximum reaction efficiency and product purity.

To accomplish the production of a purified supply of iso-alpha-acids in accordance with the invention, a supply of liquid hop extract (e.g. liquid $CO_2$ hop extract) is initially obtained. This extract includes alpha-acids, hop oils, and beta-acids therein. Next a supply of a selected metal salt isomerizing agent is obtained and combined with the liquid hop extract in a reaction vessel. In a preferred embodiment, the metal salt isomerizing agent will include but not be limited to salts of alkali metals or alkaline earth metals. Exemplary materials suitable for this purpose include oxides, hydroxides, sulfates, and chlorides of Mg, Ca, Zn, and Na with specific preferred compounds including but not limited to MgO, $Mg(OH)_2$, ZnO, $Zn(OH)_2$, CaO, $Ca(OH)_2$, and NaOH. The foregoing metal salt isomerizing agents are capable of converting alpha-acids in the liquid hop extract to iso-alpha-acid metal salts.

After the hop extract is combined with the selected metal salt isomerizing agent, a chemical mixture is produced. In a preferred embodiment, the chemical mixture is heated to a temperature sufficient to cause the mixture to boil. Boiling of the mixture provides sufficient kinetic and activation energy to drive the isomerization reaction substantially to completion in order to ensure that the reaction will occur with a maximum degree of efficiency. Otherwise, significant quantities of unisomerized alpha-acids could remain in the chemical mixture, thereby requiring increased amounts of hop extract which reduces the economic efficiency of the entire process.

The chemical mixture will ultimately separate into a first organic phase and a first aqueous phase within the reaction vessel. The first organic phase will include iso-alpha-acid metal salts, beta-acids, and hop oils therein. Next, the first organic phase is separated from the first aqueous phase by conventional fluid separation procedures (including but not limited to decantation, drainage, or cyclonic separation). The first organic phase is then washed at least once with a primary acid (e.g. a selected mineral acid including but not limited to HCl and $H_2SO_4$) in order to convert the iso-alpha-acid metal salts in the first organic phase to iso-alpha-acids. At this stage, the acidic mixture containing the first organic phase and primary acid is heated to a temperature sufficient to cause the mixture to boil. Boiling of these ingredients again provides the necessary kinetic and activation energy to drive the conversion process to completion, thereby ensuring that substantially all of the iso-alpha-acid metal salts are converted to iso-alpha-acids. This process results in the production of a second organic phase and a second aqueous phase, with the second organic phase including the iso-alpha-acids, beta-acids, and hop oils therein. Because of the boiling step indicated above, the second organic phase will be substantially free from iso-alpha-acid metal salts and residual metal ions (e.g. ions derived from the metal salt isomerization agent), with such ions being present in the second aqueous phase. In addition, the foregoing step and the unique reaction conditions associated therewith (including the use of boiling temperatures) will ensure that other extraneous ions in the mixture (e.g. Cu and Fe ions) will reside in the second aqueous phase. Such extraneous ions could originate from a variety of sources including metallic reaction vessels, conduits, and the like.

The second organic phase and the second aqueous phase are thereafter separated in a conventional manner using standard fluid separation techniques (e.g. decantation, drainage, cyclonic separation and the like). Acid washing in the foregoing manner may be undertaken in a single step or sequentially repeated (e.g. between about 2–4 times in a preferred embodiment) in order to ensure a maximum degree of purity with respect to the second organic phase. In a multi-step washing process, each acid washing stage uses a separate quantity of primary acid, with the multiple aqueous acid wash products being collectively defined herein as the second aqueous phase.

In order to remove beta-acids and hop oils from the second organic phase and produce a supply of iso-alpha-acids with a maximum degree of purity, the second organic phase is washed at least once with a primary alkaline washing agent preferably consisting of an alkaline salt (e.g. carbonates, bicarbonates, hydroxides, and oxides) of Na, K, or Ca. Exemplary and preferred materials suitable for this purpose include but are not limited to $Na_2CO_3$, $NaHCO_3$, NaOH, $K_2CO_3$, $KHCO_3$, KOH, $Ca(OH)_2$, CaO, $CaCO_3$, and $Ca(HCO_3)_2$. The primary alkaline washing agent is designed to convert iso-alpha-acids in said second organic phase to alkaline iso-alpha-acid salts. As a result, washing of said second organic phase in the foregoing manner produces an alkaline mixture which ultimately separates into a third organic phase and a third aqueous phase. The third organic phase includes the beta-acids and hop oils, with the third aqueous phase having the alkaline iso-alpha-acid salts therein. The third aqueous phase is substantially free from residual metal ions, and includes minimal amounts of beta-acids and hop oils.

The third organic phase and third aqueous phase are then separated in a conventional manner using standard fluid separation techniques (e.g. decantation, drainage, cyclonic separation and the like). Washing of the second organic phase in the foregoing manner may be undertaken in a single step or sequentially repeated (e.g. between about 2–4 times in a preferred embodiment) in order to ensure a maximum degree of purity with respect to materials in the third aqueous phase. In a multi-step washing process, each alkaline washing stage uses a separate quantity of primary alkaline washing agent, with the multiple aqueous alkaline wash products being collectively defined herein as the third aqueous phase. Finally, in a preferred embodiment, the pH of the alkaline mixture containing the primary alkaline washing agent and the second organic phase should be maintained at a level not exceeding about 9.0. Otherwise, beta-acids will begin to appear in the third aqueous phase which diminishes the purity thereof. Also, optimum results are achieved if the alkaline mixture containing the second organic phase and primary alkaline washing agent is heated to a temperature sufficient to cause the boiling thereof. Boiling again imparts sufficient kinetic and activation energy to the process so that a complete reaction will occur. As described in greater detail below, boiling must be carefully controlled at this stage, with excessive heating causing thermal degradation of the iso-alpha-acid materials.

Next, the third aqueous phase is washed at least once with a secondary acid in order to convert the alkaline iso-alpha-acid salts back to iso-alpha-acids. The secondary acid will preferably consist of a selected mineral acid including but not limited to HCl and $H_2SO_4$. This process results in the production of a reaction product which separates into a fourth organic phase and a fourth aqueous phase, with the fourth organic phase including the purified iso-alpha-acids therein. The fourth organic phase and the fourth aqueous phase are then separated in a conventional manner using standard fluid separation techniques (e.g. decantation, drainage, or cyclonic separation and the like). The fourth organic phase consists of an amber, oil-like product which includes substantially pure iso-alpha-acids therein. This iso-alpha-acid concentrate is unique in its degree of purity, and may be retained in a refrigerated environment for a considerable period of time until it is needed. Likewise, the foregoing concentrate is substantially free from residual metal ions, beta-acids, and hop oils. Because the concentrated product is substantially free from residual metal ions (e.g. ions of Mg, Ca, Zn, Na, Fe, Cu, and others derived from the isomerizing agent and metallic processing equipment), the concentrate may be added to beer and other brewed beverage products without causing the adverse consequences listed above.

In order to use the foregoing iso-alpha-acid concentrate (e.g. the fourth organic phase) in beer and other brewed beverage products, it is ultimately converted from an oil-like product to an aqueous composition which will blend in a homogeneous manner with the brewed beverage product of interest. To accomplish this conversion, the fourth organic phase (e.g. the iso-alpha-acid concentrate) is combined with a secondary alkaline washing agent in order to convert the iso-alpha-acids back to alkaline iso-alpha-acid salts. This combination of ingredients produces an aqueous iso-alpha-acid salt concentrate which may be used directly in the brewing process (e.g. at post or pre fermentation stages of production). In a preferred embodiment, the secondary alkaline washing agent will consist of a controlled amount of a monovalent alkaline salt (e.g. carbonates, bicarbonates, and hydroxides) of Na or K. Exemplary and preferred materials suitable for this purpose include but are not limited to $Na_2CO_3$, $NaHCO_3$, NaOH, $K_2CO_3$, $KHCO_3$, and KOH. In an alternative embodiment, the third aqueous phase described above may be added directly to beer or other brewed beverages (at post or pre fermentation stages of production), thereby eliminating the other steps described above. This alternative is useful if an immediate need exists for a relatively pure supply of aqueous iso-alpha-acid materials. However, it is preferred that the third aqueous phase be treated in accordance with the other steps described above prior to use in the brewing process for a variety of reasons. First, the remaining steps subsequent to generation of third aqueous phase constitute an additional acid treatment stage in which further purification occurs. Second, the aqueous iso-alpha-acid salt concentrate derived from the fourth organic phase is more readily standardized and quantitatively characterized on an analytical basis since it was derived from a composition of maximum purity (e.g. the fourth organic phase). As a result, a greater degree of batch-to-batch consistency may be obtained when the aqueous iso-alpha-acid salt concentrate derived from the fourth organic phase is used.

The hop extract processing method described herein results in purified iso-alpha-acid concentrates which are substantially free from residual metal ions (as defined above), hop oils, and beta-acids. Likewise, the iso-alpha-acid concentrates of the present invention may be produced with a maximum degree of efficiency, thereby enabling the amount of hop materials used in brewing processes to be precisely controlled. Finally, the absence of residual metal ions in the purified iso-alpha-acid products enables the final brewed beverage product (e.g. beer) to avoid problems associated with metal ion contamination.

These and other objects, features, and advantages of the invention will be described in the following Detailed Description of Preferred Embodiments.

DETAILED DESCRIPTION OF PREFERRED EMBODIMENTS

As indicated above, the present invention involves a method for producing highly purified iso-alpha-acid concentrate materials from hop extracts. The method is characterized by a substantial degree of efficiency in that it produces a high yield of iso-alpha-acids relative to the amount of starting materials being used. Likewise, as previously discussed, the resulting purified iso-alpha-acid concentrates are substantially free from residual metal ions, beta-acids, and hop oils.

The method described herein will be discussed in individual steps for the sake of clarity. In order to start the process, a supply of liquid hop extract is first obtained. Liquid hop extracts are commercial products which are well known in the art, and are produced by chemical extraction of hop cones with selected solvent materials to remove alpha-acids therefrom. In the past, extraction was undertaken using organic solvents including but not limited to methylene chloride, hexane, and methanol. However, recent technical advances have resulted in the development of extraction procedures which involve the use of liquid carbon dioxide. Information regarding the production of hop extracts is provided in Hough, J. S., et al., *Malting and Brewing Science,* Vol. 2, Chapman and Hall, Ltd., Cambridge (1982), pp. 403–405 which is incorporated herein by reference. The present invention shall not be limited to any particular type of hop extract, although liquid $CO_2$ hop extract is preferred since it does not involve the use of any organic solvents. Liquid $CO_2$ hop extract is commercially available from a variety of sources, including but not limited to Pfizer, Inc. and John I. Haas Co., both of Yakima Wash. (USA). Once the supply of liquid hop extract has been obtained, it is processed to produce iso-alpha-acid concentrate materials with a unique degree of purity using the following steps:

Step 1: Isomerization

To isomerize the alpha-acids in the liquid hop extract, a metal salt isomerizing agent is used. In a preferred embodiment, the metal salt isomerizing agent will include but not be limited to salts of alkali metals or alkaline earth metals. Exemplary materials suitable for this purpose include oxides, hydroxides, sulfates, and chlorides of Mg, Ca, Zn, and Na, with specific and preferred compounds including but not limited to MgO, Mg(OH)2, ZnO, Zn(OH)$_2$, CaO, Ca(OH)$_2$, and NaOH. The foregoing metal salt isomerizing agents are capable of converting alpha-acids in the liquid hop extract to iso-alpha-acid metal salts as shown in reaction sequence (1) listed below. In addition, it should be noted that the present invention shall not be limited to the use of any particular metal salt isomerizing agent.

The selected metal salt isomerizing agent (in powder form) is combined with the liquid hop extract in a preferred isomerizing agent: hop extract weight ratio of about 0.2:1 to 0.5:1. The amount of metal salt isomerization agent to be used will vary within the foregoing range based on the type of isomerizing agent and character of the hop extract involved. The selected metal salt isomerizing agent is combined with the liquid hop extract to produce a chemical mixture in which the isomerization process will occur. In a preferred embodiment, the foregoing mixture will be combined with deionized water and heated to a temperature sufficient to cause the mixture to boil (e.g. about 95°–100° C.). Boiling of the mixture provides sufficient kinetic and activation energy to drive the isomerization reaction substantially to completion in order to ensure that the reaction will occur with a maximum degree of efficiency. Otherwise, significant quantities of unisomerized alpha-acids could remain in the chemical mixture, thereby requiring increased amounts of hop extract which reduces the economic efficiency of the entire process. The amount of water to be used at this stage will vary within a preferred range of about 1–3 ml of water per each gram of liquid hop extract being used.

After boiling for a time period of about 15–35 minutes, the foregoing chemical mixture will separate into a first organic phase and a first aqueous phase. Depending on the constitution of the initial liquid hop extract, the first organic phase will float or sink in the reaction vessel. The first organic phase is then separated from the first aqueous phase by conventional separatory techniques including but not limited to decantation, drainage, and cyclonic separation using a standard cyclone apparatus. The first organic phase is retained and the first aqueous phase is preferably discarded. The first organic phase includes iso-alpha-acid metal salts therein which are treated in accordance with remaining process steps described below. To illustrate the production of iso-alpha-acid metal salts in accordance with the foregoing process, the following exemplary reaction is provided using Mg(OH)$_2$ as the isomerizing agent:

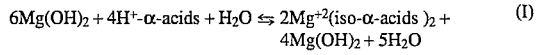
(1)

Step 2: Acid Washing to Remove Metal Ions and Produce Iso-Alpha-Acids

In this step, the iso-alpha-acid metal salts are treated to convert them into a supply of iso-alpha-acids which is substantially free from residual metal ions and metal salts. The term "residual metal ions" shall be defined to involve metal ions derived from the isomerizing agent, as well as extraneous metal ions (e.g. Fe and Cu ions) from metallic processing equipment. As indicated above, the presence of metal ions in brewed beverage products (e.g. beer) can cause a wide variety of problems ranging from haze formation to the development of molecular oxygen therein (which produces an adverse flavor). To initiate the foregoing conversion process, the first organic phase from Step (1) is washed at least once with a primary acid (e.g. a selected mineral acid including but not limited to HCl and H$_2$SO$_4$ having a normality of about 1–3N) in order to convert the iso-alpha-acid metal salts to iso-alpha-acids. The primary acid is preferably combined with the first organic phase in a primary acid: first organic phase weight ratio of about 2:1 to 4:1.

The foregoing ingredients combine to produce an acidic mixture which is preferably heated to a temperature sufficient to cause it to boil (e.g. about 95°–100° C.) for a time period of about 10–15 minutes. Boiling of the acidic mixture provides the necessary kinetic and activation energy to drive the above process to completion, thereby ensuring that substantially all of the iso-alpha-acid metal salts are converted to iso-alpha-acids. This process results in separation of the acidic mixture into a second organic phase and a second aqueous phase. In most cases, the second organic phase floats (e.g. is positioned at the top of the reaction vessel), and is characterized by a red/amber color compared with the first organic phase which was green/dark green in color. The second organic phase includes iso-alpha-acids therein (see reaction (2) below) in combination with beta-acids and hop oils from the original hop extract. Primarily because of the boiling step indicated above, as well as the other listed reaction conditions, the second organic phase will be substantially free from iso-alpha-acid metal salts and residual metal ions (as defined above), with such ions being present in the second aqueous phase. The second organic phase and the second aqueous phase are then separated in a conventional manner using standard fluid separation techniques (e.g. decantation, drainage, cyclonic separation and the like). The second organic phase is retained, and the second aqueous phase is preferably discarded.

Acid washing in the foregoing manner may be undertaken in a single step or sequentially repeated (e.g. between about 2–4 times in a preferred embodiment) in order to ensure a maximum degree of purity with respect to the second organic phase. In a multi-step acid washing process, each acid washing stage uses a separate quantity of primary acid, with the individual aqueous acid wash fractions being collectively defined herein as the second aqueous phase. Each acidic mixture produced in accordance with the individual stages in a multi-step washing process is preferably boiled in the same manner recited above. In order to determine the number of primary acid washing steps which may be necessary, the collected aqueous fractions may be individually tested with a precipitating agent to determine if any metal ions are present therein. If a precipitate forms in the aqueous fraction being tested, metal ions are present in the fraction, and additional primary acid washing steps may be appropriate. When any given aqueous fraction fails to develop a precipitate therein after addition of the precipitating agent, this step in the reaction process shall be considered completed, and the second organic phase will be substantially free from residual metal ions. The precipitating agent to be used in the foregoing procedure will vary, depending on the type of metal used in the selected metal salt isomerizing agent. The selection of a specific precipitating agent will therefore be undertaken in accordance with conventional and established analytical chemistry techniques. For example, if magnesium salt isomerizing agents are involved (e.g. Mg(OH)$_2$), exemplary precipitating agents will include but not be limited to solutions containing NaOH or K$_2$CO$_3$.

To illustrate the chemical processes occurring in this step of the present invention, the following exemplary reaction is provided in which magnesium iso-alpha-acid salts are combined with HCl:

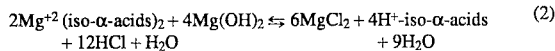
$$2Mg^{+2}(\text{iso-}\alpha\text{-acids})_2 + 4Mg(OH)_2 \rightleftarrows 6MgCl_2 + 4H^+\text{-iso-}\alpha\text{-acids} \quad (2)$$
$$+ 12HCl + H_2O \qquad\qquad\qquad + 9H_2O$$

Step 3: Separation of Iso-Alpha-Acids from Beta-Acids and Hop Oils

In this step, the second organic phase is treated to remove beta-acids and hop oils therefrom. It is desirable to separate these materials from the iso-alpha-acids because beta-acids will cause haze formation in the brewed beverage product of concern, and hop oils may impart unnecessary or undesirable flavors to the brewed products. To accomplish removal, the second organic phase is washed at least once with a primary alkaline washing agent preferably consisting of an alkaline salt (e.g. carbonates, bicarbonates, hydroxides, and oxides) of Na, K, or Ca. Exemplary and preferred materials suitable for this purpose include but are not limited to $Na_2CO_3$, $NaHCO_3$, $NaOH$, $K_2CO_3$, $KHCO_3$, $KOH$, $CaCO_3$, $CaO$, $Ca(OH)_2$, and $Ca(HCO_3)_2$. The primary alkaline washing agent is designed to convert iso-alpha-acids in the second organic phase to alkaline iso-alpha-acid salts (as shown in reaction (3) below). In a preferred embodiment, the selected primary alkaline washing agent will have a preferred normality of about 0.2–0.5 N, and will be used in a primary alkaline washing agent: second organic phase weight ratio of about 2:1 to 5:1.

Washing of the second organic phase in the foregoing manner produces an alkaline mixture which ultimately separates into a third organic phase and a third aqueous phase. The third organic phase includes beta-acids and hop oils, with the third aqueous phase having alkaline iso-alpha-acid salts therein which (after completion of this stage of the reaction process) are substantially free from residual metal ions (as defined above), beta-acids, and hop oils. The third organic phase and the third aqueous phase are then separated in a conventional manner using standard fluid separation techniques (e.g. decantation, drainage, cyclonic separation, and the like). The third aqueous phase is retained, and the third organic phase is either discarded or used for kettle hopping in the production of certain brewed beverages (since it contains hop oils as noted above).

It is important to note that the pH of the foregoing alkaline mixture should be monitored in a conventional manner to ensure that it does not exceed about 9.0. When the pH of the mixture exceeds this level, beta-acids will begin to enter the third aqueous phase of the mixture in combination with the alkaline iso-alpha-acid salts. In addition, washing of the second organic phase as described herein may be undertaken in a single step or sequentially repeated (e.g. between about 2–4 times in a preferred embodiment) in order to ensure a maximum degree of purity with respect to materials in the third aqueous phase. The decision to use a multi-step washing process will be made in accordance with preliminary pilot studies conducted on the materials under consideration. In a multi-step washing process, each alkaline washing stage will use a separate quantity of primary alkaline washing agent. When multiple washes with the primary alkaline washing agent are used, each of the resulting aqueous wash fractions are combined and collected for subsequent treatment. These combined aqueous fractions shall be collectively defined herein as the third aqueous phase. In addition, it should be noted that, when a multi-step washing process is used, the pH of each resulting alkaline mixture should be monitored to ensure that it does not exceed about 9.0 for the reasons set forth above.

Finally, in this stage of the present invention, the alkaline mixture formed from the primary alkaline washing agent and second organic phase is preferably heating to a temperature sufficient to cause the mixture to boil (e.g. about 95°–100° C.). In a multi-step washing process, each of the resulting alkaline mixtures is likewise boiled at the same temperature. Boiling in this manner is advantageous because it provides the necessary kinetic and activation energy to ensure that the reaction proceeds to completion (in order to achieve maximum product yields). However, care must be taken to ensure that boiling of the foregoing materials does not occur for an excessive time period. An exemplary and preferred boiling time period is about 5–15 minutes. Boiling for an excessive amount of time will cause degradation of the iso-alpha-acid materials and render them non-bitter.

To demonstrate the chemical processes occurring in this step of the present invention, the following exemplary reaction is provided in which the second organic phase is combined with $KHCO_3$:

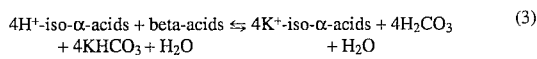
$$4H^+\text{-iso-}\alpha\text{-acids} + \text{beta-acids} \rightleftarrows 4K^+\text{-iso-}\alpha\text{-acids} + 4H_2CO_3 \quad (3)$$
$$+ 4KHCO_3 + H_2O \qquad\qquad\qquad + H_2O$$

Step 4: Conversion of Alkaline Iso-Alpha-Acid Salts Back to Iso-Alpha-Acids

In this step, the alkaline iso-alpha-acid salts produced in accordance with Step (3) are converted back to iso-alpha-acids so that they may be further purified and collected in a concentrated form having a long shelf life. Specifically, the third aqueous phase described above is washed at least once with a secondary acid in the reaction vessel to form a reaction product in the form of a second acidic mixture. The secondary acid will preferably consist of a selected mineral acid including but not limited to HCl and $H_2SO_4$ with a normality between about 1–3N. In a preferred embodiment, the secondary acid will be used in an amount sufficient so that a secondary acid: third aqueous phase weight ratio of about 0.1:1 to 0.5:1 will be maintained. The resulting reaction product ultimately separates into a fourth organic phase and a fourth aqueous phase, with the fourth organic phase including the purified iso-alpha-acids therein. The fourth organic phase will consist of a reddish-yellow (amber) layer comprised of coalesced oil globules containing substantially pure iso-alpha-acids.

In order to ensure complete isolation and separation of the fourth organic phase and fourth aqueous phase, such phases may optionally be heated at a temperature of about 40°–60° C. for about 2–10 hours in an conventional oven or hot box apparatus known in the art. These conditions will assist in coalescing all of the isomerized oil product and ensuring complete separation of the fourth organic and fourth aqueous phases. At this point, the fourth organic phase will typically sink to the bottom of the reaction vessel. Both phases may then be separated using conventional techniques (e.g. decantation, drainage, cyclonic separation, and the like). The fourth aqueous phase (which contains substantial amounts of HCl) may then be discarded or retained for reuse in the acid washing of additional amounts of hop extract at a later time. The fourth organic phase again involves an amber, oil-like product which consists of substantially pure iso-alpha-acids. This iso-alpha-acid concentrate is unique in its degree of purity, and is storage-stable with an estimated shelf-life of about 2–3 years when maintained in a refrigerated environment. In a preferred embodiment, the concentrate will be retained in a sealed vessel purged with nitrogen and maintained at a temperature of about −2° to 0° C. until it is needed in the production of brewed beverages. The concentrate is substantially free from residual metal ions (as defined above), beta-acids, and hop oils. For this reason, the concentrate may ultimately be added to beer and other brewed beverage products without causing the adverse consequences listed above.

To illustrate the chemical processes which occur in this step of the present invention, the following exemplary reaction sequence is provided in which potassium iso-alpha-acid salts are combined with HCl:

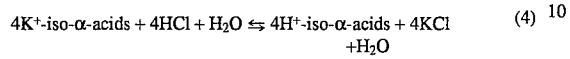

$$4K^+\text{-iso-}\alpha\text{-acids} + 4HCl + H_2O \leftrightarrows 4H^+\text{-iso-}\alpha\text{-acids} + 4KCl + H_2O \quad (4)$$

Step 5: Solubilization of the Concentrate for Use in Brewing

The iso-alpha-acid concentrate product produced in Step (4) above (the fourth organic phase) consists of an oil-like material which must be treated so that it may be combined with brewed beverage products (e.g. beer) in a homogeneous manner. To accomplish this goal, the iso-alpha-acid concentrate of Step (4) is combined with a secondary alkaline washing agent in order to convert the iso-alpha-acids in the concentrate back to alkaline iso-alpha-acid salts. This combination of ingredients produces an aqueous iso-alpha-acid salt concentrate (see reaction (5) below) which is unique in its degree of purity, and may be directly used in the brewing process at post or pre fermentation stages of production. In a preferred embodiment, the secondary alkaline washing agent will consist of a controlled amount of a monovalent alkaline salt (e.g. carbonates, bicarbonates, and hydroxides) of Na or K. Exemplary and preferred materials suitable for this purpose include but are not limited to $Na_2CO_3$, $NaHCO_3$, $NaOH$, $K_2CO_3$, $KHCO_3$, and $KOH$. The secondary alkaline washing agent is used in an amount sufficient to produce a secondary alkaline washing agent: iso-alpha-acid concentrate weight ratio of about 0.15:1 to 0.25:1. Also, optimum results are achieved if deionized water is added to the foregoing mixture of ingredients in an amount equal to about 2–4 ml of water per gram of iso-alpha-acid concentrate (fourth organic phase) being treated. It is likewise preferred that the foregoing mixture of ingredients be gently heated at a temperature of about 60°–80° C. for a time period of about 2–5 minutes to ensure that the reaction proceeds to completion. If carbonate washing agents are used in this step of the present invention, a substantial amount of $CO_2$ will be generated. Accordingly, care must be taken during the generation of $CO_2$ in order to avoid spillage of the final product. The resulting aqueous iso-alpha-acid salt concentrate is then ready for use in the production of brewed beverages, and will readily combine with the brewery products under consideration.

To illustrate the reaction processes occurring in this step of the present invention, the following exemplary reaction sequence is provided wherein iso-alpha-acids from the fourth organic phase are treated with $K_2CO_3$:

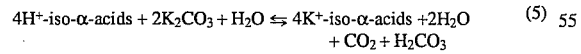

$$4H^+\text{-iso-}\alpha\text{-acids} + 2K_2CO_3 + H_2O \leftrightarrows 4K^+\text{-iso-}\alpha\text{-acids} + 2H_2O + CO_2 + H_2CO_3 \quad (5)$$

Step 6: Production of Brewed Beverages Using the Aqueous Iso-Alpha-Acid Salt Concentrates of the Present Invention As stated above, the aqueous concentrates produced in accordance with Step (5) of the present invention which include solubilized iso-alpha-acid salts therein may be combined with brewed beverage products at various stages of production (e.g. pre or post fermentation). In particular, the product described herein may be used effectively at post fermentation stages since kettle boiling of the initial hop extract is not necessary to achieve alpha-acid isomerization as in conventional processes. Also, since the product of the present invention is substantially free from residual metal ion contaminants and is highly purified, it may be used at post fermentation stages without causing any of the appearance and palatability problems described above.

The production of beer involves a number of standard procedures which have been used for centuries. Specifically, beer production generally involves the following basic steps:

1. A supply of malt is first obtained. The malt may be of any conventional type known in the art which is suitable for producing beer and other brewed beverages. An exemplary malt appropriate for use is derived from the barley variety "Moravian" obtained from the Coors Brewing Company of Golden Colorado (USA). The malt is then combined with water and heated to a temperature of about 122° F. (±2° F.) to produce a mash. At this stage, the mash will contain various malt-derived fermentable sugars (e.g. including but not limited to maltose and maltotriose). The term "fermentable sugars" as used herein involves small molecular weight sugars which are fermented by yeast into alcohol (e.g. ethanol).

2. Next, the mash is heated in order to accomplish "conversion" The term "conversion" basically involves the chemical conversion of starches in the mash to sugars. In a preferred embodiment, the temperature of the mash is raised to about 150° F. and maintained at this temperature for about 40 minutes. Thereafter, the temperature is further increased to about 162° F. After maintaining this temperature for about 10 minutes, the temperature of the mash is again increased to about 172° F. and held at this level for about 5 minutes. The foregoing sequence effectively accomplishes conversion, although the above-described temperature levels and time intervals may be suitably adjusted (if necessary) in accordance with the starting materials used to produce the mash.

3. Next, the mash is physically treated in order to remove solids therefrom (e.g. barley seed husks and the like). In a preferred embodiment, the mash is transferred into a conventional filtration apparatus known as a "lauter tun" or, in the alternative, any apparatus known in the brewing art which is suitable for filtering mash. If a lauter tun is used (which basically involves a tank with a screen-type filter therein), the bottom of the tank is filled with a supply of water. This water (along with additional quantities of water if necessary or desired) is ultimately used to spray the collected solid materials retained by the filter within the lauter tun to remove desired liquid materials therefrom. As a result, a liquid filtrate is collected which is conventionally known as "extract" or "wort".

4. The wort is thereafter transferred to a brew kettle wherein the temperature thereof is increased until boiling occurs (e.g. until the wort reaches a temperature of about 208°–212 ° F.). A fermentable carbohydrate is then added to the boiled wort. Exemplary fermentable carbohydrates include but are not limited to dextrose, sucrose, and corn syrup, with corn syrup being preferred. In a preferred embodiment, about 1.4–1.8 lbs. of fermentable carbohydrate (e.g. corn syrup) are added per gallon of wort so that the carbohydrate/wort mixture will preferably contain about 12–18% by weight fermentable carbohydrate. The fermentable carbohydrate is used as the primary source of fermentable sugars in the wort for the production of ethanol as described in greater detail below.

5. After the completion of boiling, the wort (hereinafter designated as the "fermentable mixture") is preferably transferred into a conventional whirlpool/settling system where it is allowed to settle. The fermentable mixture is thereafter transferred into a fermentation tank 6. Next, the fermentation process used to produce the desired malt beverage product is initiated. A supply of yeast is first obtained. A wide variety of specific yeasts known in the art for producing brewed beverages may be used including but not limited to *Saccharomyces uvarum* (preferred), as well as *Saccharomyces cerevisiae*. The yeast should be added in an amount sufficient to achieve a yeast cell count of about 12–60 million cells per ml of fermentable mixture. During fermentation, the fermentable mixture/yeast combination is maintained at a temperature of between about 48°–60° F. Fermentation is allowed to continue for about 7–11 days, although this time period may be adjusted as desired. As a result, a fermented product is produced.

The foregoing process steps generally describe the procedures used in producing beer. Such process steps shall represent only a generalized discussion, since many variations to the process are possible, depending on the type of product to be manufactured. At this stage in the process, the aqueous iso-alpha-acid salt product described above (e.g. either from Step (5) or Step (3)) may be introduced into the fermented product to give it an appropriate amount of bitter flavor. It is preferred that the product of Step (5) be used for the reasons given above. While the total added amount of iso-alpha-acid materials may be varied depending on the desired flavor characteristics of the beverage product, about 5–30 mg of aqueous iso-alpha-acid salt produce are typically added per liter of fermented product. At this low level of introduction, the amount of added ionic species from the aqueous iso-alpha-acid salt product (e.g. K or Na ions) is negligible relative to the quantity of fermented product being used. Accordingly, no problems are caused in the final beverage product which is unique in its high degree of purity.

To further illustrate the processes of the present invention, the following Examples are provided. Such examples shall not limit the present invention in any manner and are provided for illustrative purposes:

EXAMPLE 1

In this Example, 116.12 g of liquid $CO_2$ hop extract (containing about 50 g of alpha-acids therein) was combined with 12.0 g of $Mg(OH)_2$ in a 1.0 liter flask. Approximately 250 ml of deionized water was then added to the flask, followed by heating of the contents to boiling at 100° C. for 15 minutes.

The resulting first organic phase and first aqueous phase were then separated, with the first organic phase being washed with 250 ml of 3N HCl. The acidic mixture produced from this step was thereafter boiled at 100° C. for 10 minutes. A second organic phase and second aqueous phase were produced, with the second organic phase floating at the top of the reaction flask. Both of these phases were then separated from each other. After adding $K_2CO_3$ to the second aqueous phase and visually detecting the formation of a white precipitate, the second organic phase was washed again with 250 ml of 3N HCl, followed by the boiling thereof at 100° C. for 10 minutes. The second organic phase was then removed from the mixture, with the combined second aqueous phases being discarded.

After the first and second organic phases were generated, they were analyzed for metal ion content by standard atomic adsorption methods. The results of these analyses are presented below in TABLE 1.

TABLE 1

| Metal | Amount of metal in first organic phase (μg/g) | Amount of metal in second organic phase (μg/g) |
|---|---|---|
| K  | 8796 | 7607 |
| Na | 27   | 24   |
| Mg | 2863 | 9    |
| Ca | 34   | 7    |
| Cu | 24   | 1    |
| Fe | 22   | 2    |
| Mn | <1   | <1   |
| Zn | 3    | 2    |

These results clearly demonstrate the substantial elimination of Mg ions (as well as Ca, Fe, and Cu ions) by the primary acid washing step of the present invention and the parameters used in accordance with this step.

The second organic layer was thereafter washed with 500 ml of 0.3N $KHCO_3$. This mixture of ingredients had a pH of about 6–7, and resulted in the production of a third organic phase and a third aqueous phase. During this step, the mixture was boiled at a temperature of 100° C. for 5 minutes. This washing procedure was thereafter repeated twice and boiled at each stage using the following amounts of materials: 300 ml of 0.3N KHCO3, and 300 ml of 0.3N $K_2CO_3$. The final pH of the reaction mixture was determined to be about 7–8. The aqueous wash products (collectively referred to as the third aqueous phase) were separated from the third organic phase at the completion of each washing step and ultimately combined with each other (except for the last wash product which was discarded). The third organic phase was also discarded.

During the foregoing process, the aqueous wash product of each washing step (which collectively encompass the third aqueous phase) was analyzed to determine the amount and purity of iso-alpha-acid products therein. The results of these analyses are presented below in TABLE 2:

TABLE 2

| Cumulative Wash Vol. | pH | % Yield of iso-α material | % Purity of iso-α material | % beta-acids |
|---|---|---|---|---|
| 0 ml   | —    | —    | —     | —    |
| 500 ml | 6.20 | 67.9 | 100.0 | 0.0  |
| 300 ml | 8.80 | 85.8 | 99.0  | 1.0  |
| 300 ml | —    | 93.8 | 83.5  | 16.5 |

As shown in TABLE 2, a yield of 85.8% with 99.0% purity can be obtained using the foregoing process. It should be noted that the last alkaline wash contained only about 8% of the iso-alpha-acid materials and about 16.5% of the beta-acids (due to the high pH levels of this wash). In actual production runs of the process described in this Example, the last wash can be separately removed and reprocessed with subsequent batches of hop extract materials in order to avoid re-introduction of the beta-acids into the current product.

The third aqueous phase (totalling about 800 ml since the last wash listed above was not included) was thereafter washed with 150 ml of 3N HCl to form a milky white solution which began to separate into a fourth organic phase and fourth aqueous phase. The fourth organic phase (consisting of purified iso-alpha-acids) resembled an amber-colored oil. To facilitate complete formation of the fourth organic phase, the fourth organic and aqueous phases were placed in an oven and heated at 55° C. for 10 hours. Thereafter, both phases was placed in a 1.0 ml separatory funnel. The fourth organic phase was removed and collected, followed by placement thereof in a sealed container purged with nitrogen. The sealed container having the purified iso-alpha-acid concentrate therein was then refrigerated at a temperature of −1° C.

To produce the above-described aqueous iso-alpha-acid salt concentrate from the foregoing iso-alpha-acid concentrate, $K_2CO_3$ was added thereto. Specifically, 0.2 g of $K_2CO_3$ for each gram of iso-alpha-acid concentrate was used. About 200 ml of distilled water was also added to the mixture, followed by heating at a temperature of 80° C. for 5 minutes. The resulting aqueous iso-alpha-acid salt concentrate was then ready for use in the brewing process as desired.

EXAMPLE 2

In this Example, a 22.0 g quantity of liquid $CO_2$ hop extract containing 9.61 grams of alpha-acids was placed into a 150 ml flask. Next, 3.175 grams of $Mg(OH)_2$ was added which resulted in an alpha-acid: $Mg^{+2}$ ratio of about 1:2.04. After this step, 50 ml of distilled water was added to the mixture which was thereafter boiled at 100° C. under a nitrogen atmosphere for 21 minutes. Small samples were removed during boiling and analyzed by HPLC (high pressure liquid chromatography) to monitor the isomerization reaction.

Boiling was then stopped, and 25 ml of 1N HCl was added to the organic phase resulting from the foregoing step, followed by stirring thereof for 5 minutes. In addition, three more washes of the organic phase with 1N HCl were undertaken, followed by a rinse with deionized water. The aqueous washes were checked for the presence of $Mg^{+2}$ ions by adding 0.3N $KHCO_3$ thereto in order to determine if a $MgCO_3$ precipitate formed.

The next step involved the separation of iso-alpha-acid materials from beta-acids and hop oils in the organic phase. Multiple alkaline washes (e.g. 4) using 0.3N $KHCO_3$ were involved. Each wash was analyzed with the results summarized in TABLE 3 as follows:

TABLE 3

| Cumulative Wash Vol. | pH | % Yield of iso-α material | % Purity of iso-α material | % beta-acids |
|---|---|---|---|---|
| 0 ml | 1.23 | — | — | — |
| 83 ml | 7.02 | 66.7 | 100.0 | 0.0 |
| 150 ml | 8.02 | 85.7 | 100.0 | 0.0 |
| 225 ml | 9.45 | 97.0 | 98.6 | 1.4 |
| 285 ml | 9.45 | 99.9 | 98.0 | 2.0 |

As indicated in TABLE 3, the process of the present invention can result in iso-alpha-acid material yields of greater than about 97 with a purity level of greater than about 98%.

EXAMPLE 3

To evaluate the increase in hops utilization achieved in accordance with the present invention, pilot-scale brewing trials were conducted. Two different types of beer were evaluated. The first beer type was a "light" beer lager that was 100% attenuated and highly blended after fermentation (50:50). The second beer type was a lager using 100% malt with an attenuation of 81%, and blended after fermentation with water (70:30). Each of these test beers was brewed without the addition of hop materials to the brew kettle and subsequently fermented with debittered yeast. Aqueous iso-alpha-acid concentrate materials produced in accordance with the process described herein were added to the foregoing beer samples after the completion of fermentation and during the beer blending step.

Two control brews of the same type listed above were prepared and hopped with cone hops in the brew kettle. In the control tests, the alpha-acids were isomerized by boiling of the cone hops in the brew kettle which causes corresponding losses of iso-alpha-acids as described above. All of the beer samples were then analyzed using conventional chemical techniques in order to demonstrate the increased degree of hops utilization which is achieved using the products of the present invention compared with standard cone hopping procedures. The results of these analyses are provided below in TABLE 4:

TABLE 4

ANALYSIS OF LAGER BEERS

| Parameter | Light Beer (control) | Light Beer (test) | Malt Beer (control) | Malt Beer (test) |
|---|---|---|---|---|
| Original Extract | 7.8 | 7.8 | 11.2 | 13.4 |
| Apparent Extract | 0.0 | 0.0 | 2.7 | 2.5 |
| α-acids added from cone hops (mg/L) | 100.0 | — | 70.0 | — |
| iso-α-acid materials added from aqueous conc. solutions described above (mg/L) | — | 11.7 | — | 17.7 |
| Beer Bitterness Units | 10.0 | 9.5 | 12.0 | 13.4 |
| Beer bitters % utilization | 10.0 | 81.2 | 17.1 | 75.7 |
| Overall hop % utilization (at 90% yield) | 10.0 | 73.1 | 17.1 | 68.1 |

It is readily apparent from TABLE 4 that the iso-alpha-acid concentrate materials described herein substantially improve hop utilization efficiency compared with conventional kettle hopping/isomerizing procedures.

As indicated above, the present invention enables highly purified iso-alpha-acid concentrate materials to be produced from hop extracts. The foregoing method is highly efficient in that it produces a high yield of iso-alpha-acid materials relative to the amount of starting ingredients being used (e.g. typically about an 85–97% yield). Likewise, as previously discussed, the resulting purified iso-alpha-acid products are substantially free from residual metal ions, beta-acids, and hop oils.

Having herein described preferred embodiments of the present invention, it is anticipated that modifications may be made thereto by individuals skilled in the art which nonetheless remain within the scope of the invention. Accordingly, the present invention shall be construed in accordance with the following claims:

The invention that is claimed is:

1. A method for producing a purified iso-alpha-acid concentrate from hop extract materials comprising the steps of:

providing a supply of hop extract comprising alpha-acids, hop oils, and beta-acids therein;

combining said hop extract with a metal salt isomerizing agent capable of converting said alpha-acids in said hop extract to iso-alpha-acid metal salts, said combining of said hop extract with said metal salt isomerizing agent producing a chemical mixture comprising a first organic phase and a first aqueous phase, said first organic phase comprising said iso-alpha-acid metal salts, said beta-acids, and said hop oils therein;

heating said chemical mixture to a temperature sufficient to cause said chemical mixture to boil;

separating said first organic phase from said first aqueous phase;

washing said first organic phase at least once with a primary acid capable of converting said iso-alpha-acid metal salts in said first organic phase to iso-alpha-acids, said washing of said first organic phase with said primary acid producing an acidic mixture comprising a second organic phase and a second aqueous phase, said second organic phase comprising said iso-alpha-acids, said beta-acids, and said hop oils therein;

heating said acidic mixture to a temperature sufficient to cause said acidic mixture to boil;

separating said second organic phase from said second aqueous phase;

washing said second organic phase at least once with a primary alkaline washing agent capable of converting said iso-alpha-acids in said second organic phase to alkaline iso-alpha-acid salts, said washing of said second organic phase producing an alkaline mixture comprising a third organic phase and a third aqueous phase, said third organic phase comprising said beta-acids and said hop oils therein, with said third aqueous phase comprising said alkaline iso-alpha-acid salts therein;

separating said third aqueous phase from said third organic phase;

combining said third aqueous phase with a secondary acid capable of converting said alkaline iso-alpha-acid salts in said third organic phase back to said iso-alpha-acids, said combining of said third aqueous phase with said secondary acid producing a reaction product comprising a fourth organic phase and a fourth aqueous phase, said fourth organic phase comprising said iso-alpha-acids therein; and separating said fourth organic phase from said fourth aqueous phase, said fourth organic phase being used as said purified iso-alpha-acid concentrate.

2. The method of claim 1 wherein said metal salt isomerizing agent is selected from the group consisting of MgO, $Mg(OH)_2$, ZnO, $Zn(OH)_2$, CaO, $Ca(OH)_2$, and NaOH.

3. The method of claim 1 wherein said primary acid is selected from the group consisting of HCl and $H_2SO_4$.

4. The method of claim 1 wherein said primary alkaline washing agent is selected from the group consisting of $Na_2CO_3$, $NaHCO_3$, NaOH, $K_2CO_3$, $KHCO_3$, KOH, $CaCO_3$, CaO, $Ca(OH)_2$, and $Ca(HCO_3)_2$.

5. The method of claim 1 wherein said secondary acid is selected from the group consisting of HCl and $H_2SO_4$.

6. The method of claim 1 further comprising the step of washing said fourth organic phase at least once with a secondary alkaline washing agent capable of converting said iso-alpha-acids in said fourth organic phase back to alkaline iso-alpha-acid salts, said washing of said fourth organic phase producing an aqueous iso-alpha-acid salt concentrate.

7. The method of claim 6 wherein said secondary alkaline washing agent is selected from the group consisting of $Na_2CO_3$, $NaHCO_3$, NaOH, $K_2CO_3$, $KHCO_3$, and KOH.

8. The method of claim 1 further comprising the step of heating said alkaline mixture to a temperature sufficient to cause said alkaline mixture to boil.

9. The method of claim 1 wherein said washing of said first organic phase at least once with said primary acid comprises washing said first organic phase about 2–4 times using said primary acid, with a separate quantity of said primary acid being used for each washing of said first organic phase.

10. The method of claim 1 wherein said washing of said second organic phase at least once with said primary alkaline washing agent comprises washing said second organic phase about 2–4 times using said primary alkaline washing agent, with a separate quantity of said primary alkaline washing agent being used for each washing of said second organic phase.

11. A method for producing a purified iso-alpha-acid concentrate from hop extract materials comprising the steps of:

providing a supply of hop extract comprising alpha-acids, hop oils, and beta-acids therein;

combining said hop extract with a metal salt isomerizing agent capable of converting said alpha-acids in said hop extract to iso-alpha-acid metal salts, said metal salt isomerizing agent being selected from the group consisting of MgO, Mg(OH) 2, ZnO, $Zn(OH)_2$, CaO, $Ca(OH)_2$, and NaOH, said combining of said hop extract with said metal salt isomerizing agent producing a chemical mixture comprising a first organic phase and a first aqueous phase, said first organic phase comprising said iso-alpha-acid metal salts, said beta-acids, and said hop oils therein;

heating said chemical mixture to a temperature sufficient to cause said chemical mixture to boil;

separating said first organic phase from said first aqueous phase;

washing said first organic phase at least once with a primary acid in order to convert said iso-alpha-acid metal salts in said first organic phase to iso-alpha-acids, said primary acid being selected from the group consisting of HCl and $H_2SO_4$, said washing of said first organic phase with said primary acid producing an acidic mixture comprising a second organic phase and a second aqueous phase, said second organic phase comprising said iso-alpha-acids, said beta-acids, and said hop oils therein;

heating said acidic mixture to a temperature sufficient to cause said acidic mixture to boil;

separating said second organic phase from said second aqueous phase;

washing said second organic phase at least once with a primary alkaline washing agent capable of converting said iso-alpha-acids in said second organic phase to alkaline iso-alpha-acid salts, said primary alkaline washing agent being selected from the group consisting of $Na_2CO_3$, $NaHCO_3$, NaOH, $K_2CO_3$, $KHCO_3$, KOH, $CaCO_3$, CaO, $Ca(OH)_2$, and $Ca(HCO_3)_2^-$, said washing of said second organic phase producing an alkaline mixture comprising a third organic phase and a third aqueous phase, said third organic phase comprising said beta-acids and said hop oils therein, with said third aqueous phase comprising said alkaline iso-alpha-acid salts therein;

separating said third aqueous phase from said third organic phase;

combining said third aqueous phase with a secondary acid in order to convert said alkaline iso-alpha-acid salts in said third aqueous phase back to said iso-alpha-acids, said secondary acid being selected from the group consisting of HCl and $H_2SO_4$, said combining of said third aqueous phase with said secondary acid producing a reaction product comprising a fourth organic phase and a fourth aqueous phase, said fourth organic phase comprising said iso-alpha-acids therein; and separating said fourth organic phase from said fourth aqueous phase, said fourth organic phase being used as said purified iso-alpha-acid concentrate.

12. The method of claim 11 further comprising the step of washing said fourth organic phase with a secondary alkaline washing agent capable of converting said iso-alpha-acids in said fourth organic phase back to said alkaline iso-alpha-acid salts, said secondary alkaline washing agent being selected from the group consisting of $Na_2CO_3$, $NaHCO_3$, NaOH, $K_2CO_3$, $KHCO_3$, and KOH, said washing of said fourth organic phase producing an aqueous iso-alpha-acid salt concentrate.

13. The method of claim 11 further comprising the step of heating said alkaline mixture to a temperature sufficient to cause said alkaline mixture to boil.

14. The method of claim 11 wherein said washing of said first organic phase at least once with said primary acid comprises washing said first organic phase about 2–4 times using said primary acid, with a separate quantity of said primary acid being used for each washing of said first organic phase, and said washing of said second organic phase at least once with said primary alkaline washing agent comprises washing said second organic phase about 2–4 times using said primary alkaline washing agent, with a separate quantity of said primary alkaline washing agent being used for each washing of said second organic phase.

15. A method for producing a brewed beverage product comprising the steps of:

providing a supply of hop extract comprising alpha-acids, hop oils, and beta-acids therein;

combining said hop extract with a metal salt isomerizing agent capable of converting said alpha-acids in said hop extract to iso-alpha-acid metal salts, said combining of said hop extract with said metal salt isomerizing agent producing a chemical mixture comprising a first organic phase and a first aqueous phase, said first organic phase comprising said iso-alpha-acid metal salts, said beta-acids, and said hop oils therein;

heating said chemical mixture to a temperature sufficient to cause said chemical mixture to boil;

separating said first organic phase from said first aqueous phase;

washing said first organic phase at least once with a primary acid capable of converting said iso-alpha-acid metal salts in said first organic phase to iso-alpha-acids, said washing of said first organic phase with said primary acid producing an acidic mixture comprising a second organic phase and a second aqueous phase, said second organic phase comprising said iso-alpha-acids, said beta-acids, and said hop oils therein;

heating said acidic mixture to a temperature sufficient to cause said acidic mixture to boil;

separating said second organic phase from said second aqueous phase;

washing said second organic phase at least once with a primary alkaline washing agent capable of converting said iso-alpha-acids in said second organic phase to alkaline iso-alpha-acid salts, said washing of said second organic phase producing an alkaline mixture comprising a third organic phase and a third aqueous phase, said third organic phase comprising said beta-acids and said hop oils therein, with said third aqueous phase comprising said alkaline iso-alpha-acid salts therein;

separating said third aqueous phase from said third organic phase;

combining said third aqueous phase with a secondary acid capable of converting said alkaline iso-alpha-acid salts in said third aqueous phase back to said iso-alpha-acids, said combining of said third aqueous phase with said secondary acid producing a reaction product comprising a fourth organic phase and a fourth aqueous phase, said fourth organic phase comprising said iso-alpha-acids therein;

separating said fourth organic phase from said fourth aqueous phase;

washing said fourth organic phase with a secondary alkaline washing agent capable of converting said iso-alpha-acids in said fourth organic phase back to said alkaline iso-alpha-acid salts, said washing of said fourth organic phase producing an aqueous iso-alpha-acid salt concentrate;

providing a supply of malt;

combining said malt with water to form a mash;

heating said mash;

extracting liquid from said mash;

combining said liquid with a supply of a fermentable carbohydrate to form a fermentable mixture;

combining said fermentable mixture with yeast;

allowing said yeast to ferment said fermentable mixture for a time period sufficient to convert said fermentable carbohydrate into ethanol in order to produce a fermented product; and adding said aqueous iso-alpha-acid salt concentrate to said fermented product.

16. The method of claim 15 wherein said washing of said first organic phase at least once with said primary acid comprises washing said first organic phase about 2–4 times using said primary acid, with a separate quantity of said primary acid being used for each washing of said first organic phase, and said washing of said second organic phase at least once with said primary alkaline washing agent comprises washing said second organic phase about 2–4 times using said primary alkaline washing agent, with a separate quantity of said primary alkaline washing agent being used for each washing of said second organic phase.

17. The method of claim 15 further comprising the step of heating said alkaline mixture to a temperature sufficient to cause said alkaline mixture to boil.

18. A method for producing a brewed beverage product comprising the steps of:

providing a supply of hop extract comprising alpha-acids, hop oils, and beta-acids therein;

combining said hop extract with a metal salt isomerizing agent capable of converting said alpha-acids in said hop extract to iso-alpha-acid metal salts, said metal salt isomerizing agent being selected from the group consisting of MgO, $Mg(OH)_2$, ZnO, $Zn(OH)_2$, CaO, $Ca(OH)_2$, and NaOH, said combining of said hop extract with said metal salt isomerizing agent producing a chemical mixture comprising a first organic phase and a first aqueous phase, said first organic phase comprising said iso-alpha-acid metal salts, said beta-acids, and said hop oils therein;

heating said chemical mixture to a temperature sufficient to cause said chemical mixture to boil;

separating said first organic phase from said first aqueous phase;

washing said first organic phase at least once with a primary acid in order to convert said iso-alpha-acid metal salts in said first organic phase to iso-alpha-acids, said primary acid being selected from the group consisting of HCl and $H_2SO_4$, said washing of said first organic phase with said primary acid producing an acidic mixture comprising a second organic phase and a second aqueous phase, said second organic phase comprising said iso-alpha-acids, said beta-acids, and said hop oils therein;

heating said acidic mixture to a temperature sufficient to cause said acidic mixture to boil;

separating said second organic phase from said second aqueous phase;

washing said second organic phase at least once with a primary alkaline washing agent capable of converting said iso-alpha-acids in said second organic phase to alkaline iso-alpha-acid salts, said primary alkaline washing agent being selected from the group consisting of $Na_2CO_3$, $NaHCO_3$, NaOH, $K_2CO_3$, $KHCO_3$, KOH, $CaCO_3$, CaO, $Ca(OH)_2$, and $Ca(HCO_3)_2$, said washing of said second organic phase producing an alkaline mixture comprising a third organic phase and a third aqueous phase, said third organic phase comprising said beta-acids and said hop oils therein, with said third aqueous phase comprising said alkaline iso-alpha-acid salts therein;

separating said third aqueous phase from said third organic phase;

combining said third aqueous phase with a secondary acid in order to convert said alkaline iso-alpha-acid salts in said third aqueous phase back to said iso-alpha-acids, said secondary acid being selected from the group consisting of HCl and $H_2SO_4$, said combining of said third aqueous phase with said secondary acid producing a reaction product comprising a fourth organic phase and a fourth aqueous phase, said fourth organic phase comprising said iso-alpha-acids therein;

separating said fourth organic phase from said fourth aqueous phase;

washing said fourth organic phase with a secondary alkaline washing agent capable of converting said iso-alpha-acids in said fourth organic phase back to said alkaline iso-alpha-acid salts, said secondary alkaline washing agent being selected from the group consisting of $Na_2CO_3$, $NaHCO_3$, NaOH, $K_2CO_3$, $KHCO_3$, and KOH, said washing of said fourth organic phase producing an aqueous iso-alpha-acid salt concentrate;

providing a supply of malt;

combining said malt with water to form a mash;

heating said mash;

extracting liquid from said mash;

combining said liquid with a supply of a fermentable carbohydrate to form a fermentable mixture;

combining said fermentable mixture with yeast;

allowing said yeast to ferment said fermentable mixture for a time period sufficient to convert said fermentable carbohydrate into ethanol in order to produce a fermented product; and adding said aqueous iso-alpha-acid salt concentrate to said fermented product.

19. The method of claim 18 wherein said washing of said first organic phase at least once with said primary acid comprises washing said first organic phase about 2–4 times using said primary acid, with a separate quantity of said primary acid being used for each washing of said first organic phase, and said washing of said second organic phase at least once with said primary alkaline washing agent comprises washing said second organic phase about 2–4 times using said primary alkaline washing agent, with a separate quantity of said primary alkaline washing agent being used for each washing of said second organic phase.

20. The method of claim 18 further comprising the step of heating said alkaline mixture to a temperature sufficient to cause said alkaline mixture to boil.

\* \* \* \* \*

UNITED STATES PATENT AND TRADEMARK OFFICE
CERTIFICATE OF CORRECTION

PATENT NO. : 5,478,580
DATED : December 26, 1995
INVENTOR(S) : ROBERT T. FOSTER, II It is certified that error appears in the above-identified patent and that said Letters Patent is hereby corrected as shown below:

Column 9, line 2, delete "Mg(OH)2" and insert therefor -- $Mg(OH)_2$ --;
Column 12, line 47, delete "an" and insert therefor --a--;
Column 14, line 67, insert --.-- after "tank".

Claim 11, Column 20, line 25, delete "Mg(OH)2" and insert therefor --$Mg(OH)_2$--.
Claim 11, Column 20, line 56, delete "Ca(HCO3)2⁻" and insert therefor --$Ca(HCO_3)_2$--.

Signed and Sealed this

Seventh Day of May, 1996

Attest:

BRUCE LEHMAN

Attesting Officer    Commissioner of Patents and Trademarks